W. H. Towers.
Inkstand.
No. 1,489. Reissued Jun. 2. 1863.
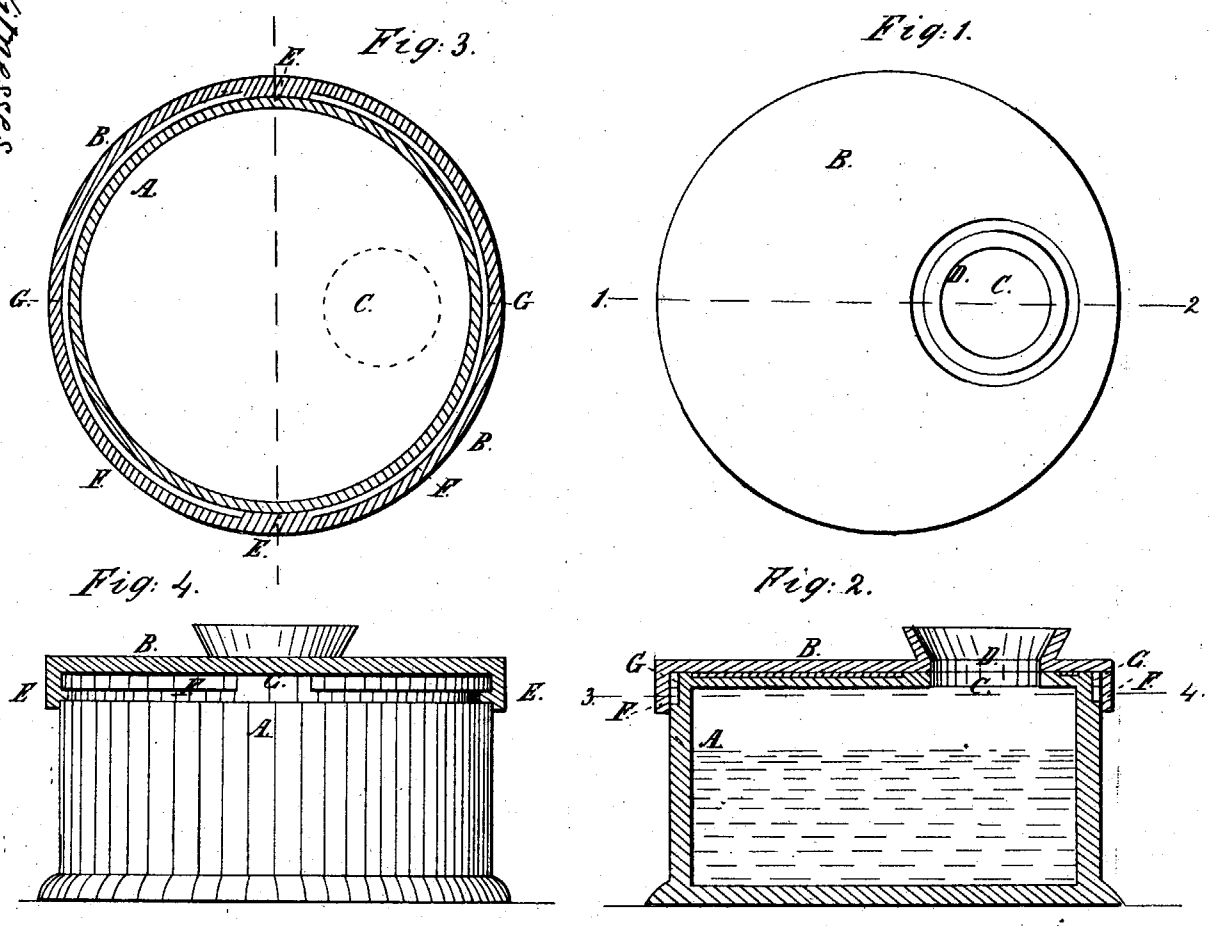
Witnesses.
F. H. Brooks
James Mack.
Inventor.
Wm. H. Towers

UNITED STATES PATENT OFFICE.

WILLIAM H. TOWERS, OF BOSTON, MASSACHUSETTS.

INKSTAND.

Specification forming part of Letters Patent No. 30,266, dated October 2, 1860; Reissue No. 1,489, dated June 2, 1863.

*To all whom it may concern:*

Be it known that I, WILLIAM H. TOWERS, late of the city of New York, and now of Boston, Massachusetts, have invented a new and useful Improved Inkstand; and I do hereby declare that the following is a full and exact description thereof, reference being had to the accompanying drawings and the letters of reference marked thereon.

Figure 1 is a top view of the improved inkstand. Fig. 2 is a vertical section of the same at the line 1 2 of Fig. 1. Fig. 3 is a horizontal section of same at the line 3 4 of Fig. 2. Fig. 4 is a section through the center of cover and a side elevation of the ink-holder.

The same letters in different figures refer always to the same parts.

The nature of my invention consists in providing the reservoir for ink or ink-holder with a turning cover or plate having a hole or opening through it between its center and periphery corresponding in shape and eccentricity of position with a perforation made in the top of the ink-holder, so that this cover or outer plate when turned about its center as an axis in the arc of a circle, and without displacement or separation from the ink-holder, will serve either to close and mask or to uncover and unmask the opening or perforation made in the top of the ink-holder, and to render the same when closed both water and air tight.

To enable others skilled in the art to make and use my invention, I proceed to describe its construction.

I make the parts forming the inkstand—namely, the ink-holder A and cover or covering-plate B—of circular form, and of any suitable material or materials. The top of the ink-holder A is perforated with a circular opening or hole, C, in eccentric position, corresponding in shape and eccentricity of position with the opening or perforation D in the covering-plate B. The hole D is surrounded with a conical tube of suitable height to serve as a guide for the pen. The opening or hole C is surrounded by a raised rim or flange at its edge upon the upper or outer surface, extending out far enough to meet the lower surface of the covering-plate B, and forming a close or water tight contact therewith; the cover or covering-plate B is supported by and upon the top of the ink-holder A in such manner that its lower surface shall come into close contact with the rim raised about the hole C, as above shown, and prevent the escape of ink when the cover is so turned as to close the opening C. The rim of cover D is provided with lugs E, which project from the inner periphery of the same at opposite points, and these lugs enter and move in a horizontal groove, F, formed in the periphery of the body A, and serve to press and hold the cover B upon the top of the body, when turned about its center, as above stated. Two depressions, C, are made opposite to each other in the periphery of the body A, which extend from the top of the same into the groove F, and serve to allow the lugs to pass through into the groove F, and thereby to attach or detach the covering-plate to or from the ink-holder or body A.

The use of the lugs and groove or grooves for the purpose of attaching the covering-plate and ink-holder together is not essential. This may be done by other equivalent devices without affecting the principle of my invention.

The openings or holes D C when placed in conjunction admit the pen to pass through to the ink. By turning the cover B a short distance the opening C or inlet to the ink is entirely and tightly closed, and the escape of ink or evaporation thereof prevented, and this without the removal of the cover.

I do not claim the use in an inkstand of two disks or plates having corresponding orifices eccentrically located so that the same may be opened and closed by the rotation of one upon the other; but

What I claim as my invention, and desire to secure by Letters Patent, is—

An inkstand the cap or cover of which consists of two concentric plates or disks, one above the other, and perforated by a correspondingly eccentric hole, the lower of said two plates being provided with a flange or rim raised around its hole in such manner as to avoid all leakage of ink between the plates, and made to operate substantially as above described.

WM. H. TOWERS.

Witnesses:

F. A. BROOKS,

JAMES MACK.